United States Patent
Tsukamoto et al.

(10) Patent No.: US 9,114,799 B2
(45) Date of Patent: Aug. 25, 2015

(54) BRAKE SYSTEM FOR VEHICLE INCLUDING CONTINUOUSLY VARIABLE BELT TRANSMISSION

(71) Applicant: Kanzaki Kokyukoki Mfg. Co., Ltd., Amagasaki-shi, Hyogo (JP)

(72) Inventors: Michio Tsukamoto, Amagasaki (JP); Masaru Iida, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 31 days.

(21) Appl. No.: 14/047,582

(22) Filed: Oct. 7, 2013

(65) Prior Publication Data

US 2014/0100078 A1   Apr. 10, 2014

(30) Foreign Application Priority Data

Oct. 9, 2012   (JP) ................. 2012-224190

(51) Int. Cl.
| | |
|---|---|
| B60W 10/107 | (2012.01) |
| B60W 10/196 | (2012.01) |
| B60W 10/02 | (2006.01) |
| B60T 10/02 | (2006.01) |
| B60T 10/04 | (2006.01) |
| B60W 30/18 | (2012.01) |
| F16H 7/08 | (2006.01) |
| F16H 37/02 | (2006.01) |

(52) U.S. Cl.
CPC .............. *B60W 10/107* (2013.01); *B60T 10/02* (2013.01); *B60T 10/04* (2013.01); *B60W 10/02* (2013.01); *B60W 10/196* (2013.01); *B60W 2030/18081* (2013.01); *B60W 2540/10* (2013.01); *B60W 2710/065* (2013.01); *F16H 7/0827* (2013.01); *F16H 37/021* (2013.01); *Y10T 477/621* (2015.01); *Y10T 477/6237* (2015.01)

(58) Field of Classification Search
USPC ........................................... 475/199
See application file for complete search history.

(56) References Cited

U.S. PATENT DOCUMENTS

| | | | | |
|---|---|---|---|---|
| 4,771,656 | A * | 9/1988 | Itoh et al. ................. | 477/42 |
| 4,773,283 | A * | 9/1988 | Dach et al. ............... | 74/720 |
| 2012/0053012 | A1 * | 3/2012 | Yamada et al. ........... | 477/46 |

FOREIGN PATENT DOCUMENTS

JP   S48-44548   12/1973

* cited by examiner

*Primary Examiner* — Erin D Bishop
*Assistant Examiner* — Tinh Dang
(74) *Attorney, Agent, or Firm* — Sterne Kessler Goldstein & Fox P.L.L.C.

(57) ABSTRACT

A brake system is provided for a vehicle equipped with a continuously variable belt transmission (hereafter a "CVT") having a CVT input shaft and a CVT output shaft. The CVT functions as a clutch-disengagement action for isolating rotation of the CVT output shaft from the CVT input shaft when a rotary speed of the CVT input shaft is reduced to a certain level. The vehicle is equipped with a prime mover driving the CVT input shaft so that an output rotary speed of the prime mover defines the rotary speed of the CVT input shaft. The vehicle includes an accelerator manipulator for controlling the output rotary speed of the prime mover. The brake system can cause a resistance against the rotation of the CVT output shaft using the accelerator manipulator to reduce the output rotary speed of the prime mover to make the CVT function as the clutch-disengagement action.

12 Claims, 9 Drawing Sheets

BRAKE SYSTEM FOR VEHICLE INCLUDING CONTINUOUSLY VARIABLE BELT TRANSMISSION

BACKGROUND OF THE INVENTION

1. Field of the Invention

The present invention relates to a brake system for a vehicle equipped with a continuously variable belt transmission (hereinafter referred to as "CVT").

2. Related Art

As disclosed by JP S48-44548 Y, a conventional CVT to be equipped on a vehicle such as a golf car or golf cart includes a driver pulley, a driven pulley and a belt interposed between the drive and driven pulleys. A pulley shaft of the driver pulley serves as an input shaft of the CVT, i.e., a CVT input shaft, to be drivingly connected to a prime mover such as an internal combustion engine arranged upstream of the CVT in a power train of the vehicle. A pulley shaft of the driven pulley serves as an output shaft of the CVT, i.e., a CVT output shaft, to be drivingly connected to an axle and drive wheels arranged downstream of the CVT in the power train of the vehicle.

At least one of the driver and driven pulleys has a variable pitch diameter so that a speed ratio of the CVT between the CVT input and output shafts can be changed by changing the pitch diameter. The driver pulley includes a pair of half pulleys. One half pulley is axially movable along the pulley shaft (i.e., CVT input shaft), and the other half pulley is axially immovable along the pulley shaft. As the output rotary speed of the prime mover is reduced, the centrifugal force applied to the axial-movable half pulley is reduced so that the axial-movable half pulley moves away from the axial-immovable half pulley. Therefore, the driver pulley functions as a clutch-disengagement action to isolate the belt, the driven pulley and the CVT output shaft from the rotation of the CVT input shaft driven by the prime mover. If the prime mover is an engine, such a clutch-disengagement action of the driver pulley advantageously ensures a stable idling of the engine free from load that the vehicle receives at the drive wheels.

However, when the vehicle descends a slope at an engine idling speed, an operator of the vehicle has to repeat depressing a brake pedal for braking the axle because the belt, the driven pulley and the CVT output shaft receive no power from the idling engine while the driver pulley functions as the clutch-disengagement action. Such a repeat of braking may possibly cause a brake fade or a vapor lock. Unless an operator carefully manipulates the brake pedal, the descending vehicle may happen to be accelerated to an expected high speed. In other words, the vehicle equipped with the CVT does not have means having an effect similar to an engine brake of a vehicle equipped with a gear transmission.

SUMMARY OF THE INVENTION

An object of the invention is to provide a brake system for a vehicle equipped with a CVT so as to effectively reduce a rotary speed of a CVT output shaft drivingly connected to an axle and drive wheels, thereby preventing the vehicle descending a slope while the CVT functioning as the clutch-disengagement action from being unexpectedly accelerated.

To achieve the object, a brake system is provided, for a vehicle equipped with a CVT having a CVT input shaft and a CVT output shaft. The CVT functions as a clutch-disengagement action for isolating rotation of the CVT output shaft from rotation of the CVT input shaft when a rotary speed of the CVT input shaft is reduced to a certain level. The vehicle is equipped with a prime mover driving the CVT input shaft so that an output rotary speed of the prime mover defines the rotary speed of the CVT input shaft. The vehicle is equipped with an accelerator manipulator for controlling the output rotary speed of the prime mover. The brake system is configured to cause a resistance against the rotation of the CVT output shaft according to an operation of the accelerator manipulator to reduce the output rotary speed of the prime mover so as to make the CVT function as the clutch-disengagement action.

Therefore, the brake system causing the resistance functions similar to an engine brake of a vehicle equipped with a gear transmission. The resistance caused by the brake system effectively reduces the rotary speed of the CVT output shaft drivingly connected to an axle and drive wheels of the vehicle so as to prevent the vehicle descending a slope, while the CVT functions as the clutch-disengagement action, from being unexpectedly accelerated. Further, therefore, the brake system advantageously reduces the need of repetitive manipulation for applying another manipulatable brake e.g., depression of a brake pedal for applying a drum brake provided on an axle of the vehicle, thereby ensuring a stable action of the manipulatable brake and prolonging a life of the manipulatable brake.

Preferably, in a first aspect, the brake system comprises a hydraulic pump driven by the rotation of the CVT output shaft, and a hydraulic circuit for supplying fluid, to the hydraulic pump and for releasing fluid delivered from the hydraulic pump. The hydraulic circuit includes a hydraulic resistance means for applying a hydraulic pressure to a hydraulic fluid flow caused by the hydraulic pump so that the hydraulic pressure serves as the resistance of the brake system against the rotation of the CVT output shaft.

Therefore, the brake system in the first aspect uses the pumping action of the hydraulic pump causing the hydraulic fluid flow having the hydraulic pressure defined by the hydraulic resistance means as the resistance against the rotation of the CVT output shaft. The braking system using the hydraulic pump is advantageous in economy because an available hydraulic pump used for lubricating gears and others or used as a hydrostatic transmission (HST) can serve as the hydraulic pump of the brake system.

Preferably, in the first aspect, the hydraulic pump has a variable displacement and is provided with an adjusting means for adjusting the variable displacement. The brake system further comprises a pump control linkage operatively connecting the accelerator manipulator to the adjusting means of the hydraulic pump.

Therefore, the adjusting means of the hydraulic pump serves as a switch that is shifted according to the operation of the accelerator manipulator so as to select whether or not the hydraulic pump acts to cause the hydraulic fluid flow having the hydraulic pressure resisting the rotation of the CVT output shaft. If the hydraulic pump is an axial plunger type variable displacement hydraulic pump, a movable swash plate of the hydraulic pump can serve as the adjusting means of the hydraulic pump. In this case, due to the pump control linkage, when the accelerator manipulator is operated to reduce the output rotary speed of the prime mover so as to make the CVT function as the clutch-disengagement action, the tilt angle of the movable swash plate is increased to make the hydraulic pump act to cause the hydraulic fluid flow having the resistant hydraulic pressure. On the other hand, it is conceivable that when the accelerator manipulator is operated to keep the output rotary speed of the prime mover for traveling of the vehicle (not for idling of an engine serving as the prime mover) so that the CVT functions as a clutch-engagement action (i.e., the CVT transmits power from the CVT input shaft to the CVT output shaft), the tilt angle of the movable swash plate is reduced to cancel the action of the hydraulic pump causing the hydraulic fluid flow having the resistant hydraulic pressure, thereby ensuring rotation of the CVT output shaft and drive wheels during travel of the vehicle free from the resistance caused by the brake system.

Preferably, the brake system having the variable displacement hydraulic pump further comprises a detection means for detecting a condition of the vehicle, and a controller for controlling the adjusting means of the hydraulic pump based on a detection signal from the detection means in correspondence to the detected condition of the vehicle.

Therefore, the adjusting means of the hydraulic pump is finely controlled in correspondence of the conditions of the vehicle, e.g., an angle of a slope or a rotary speed of an axle of the vehicle, as well as the clutch-disengagement action of the CVT or the manipulation of the accelerator manipulator.

Alternatively, preferably, in the first aspect, the hydraulic resistance means is provided with an adjusting means for adjusting the hydraulic pressure. The brake system further comprises a hydraulic pressure control linkage operatively connecting, the accelerator manipulator to the adjusting means of the hydraulic resistance means.

Therefore, the adjusting means of the hydraulic resistance means serves as a hydraulic pressure control means for controlling the hydraulic pressure of the hydraulic fluid flow. Due to the hydraulic pressure control linkage, when the accelerator manipulator is operated to reduce the output rotary speed of the prime mover so that the CVT functions as the clutch-disengagement action, the adjusting means is controlled so that the hydraulic fluid flow caused by the hydraulic pump has an optimal hydraulic pressure appropriately reducing the rotary speed of the CVT output shaft. On the other hard, it is conceivable that when the accelerator manipulator is operated to keep, the output rotary speed of the prime mover for traveling, of the vehicle (not for idling of an engine serving as the prime mover) so that the CVT functions as a clutch-engagement action (i.e., the CVT transmits power from the CVT input shaft to the CVT output shaft), the adjusting means is controlled to reduce or cancel the hydraulic pressure so as to allow the hydraulic fluid flow to have no or little resistant hydraulic pressure, thereby ensuring rotation of the CVT output shaft and drive wheels during travel of the vehicle completely or almost free from the resistance caused by the brake system. Incidentally, due to the variable hydraulic pressure caused by the hydraulic resistance means, a fixed displacement hydraulic pump, e.g., an axial plunger type hydraulic pump having a fixed swash plate or a gear pump (including a trochoid pump), can serve as the hydraulic pump of the brake system. In this case, unless the CVT output shaft is stationary, the fixed displacement hydraulic pump causes a hydraulic fluid flow regardless of the rotary speed of the prime mover or regardless of whether the CVT functions as the clutch-disengagement action or the clutch-engagement action.

Preferably, the brake system including the hydraulic resistance means having the adjusting means for changing the hydraulic pressure further comprises a detection means detecting a condition of the vehicle, and a controller for controlling the adjusting means of the hydraulic resistance means based on a detection signal from the detection means so as to adjust the hydraulic pressure in correspondence to the detected condition of the vehicle.

Therefore, the adjusting means of the hydraulic resistance means can minutely adjust the resistant hydraulic pressure of hydraulic fluid flow caused by the hydraulic pump serving as the braking force to reduce the rotary speed of an axle of the vehicle in correspondence to various parameters about conditions of the vehicle, e.g., an angle of a slope or a rotary speed of the axle, as well as the manipulation of the accelerator manipulator.

Preferably, in the first aspect, a relief valve serves as the hydraulic resistance means. Alternatively, preferably, in the first aspect, a throttle serves as the hydraulic resistance means.

Therefore, these available members can serve as the hydraulic resistance means, thereby reducing costs. Further, the throttle may be advantageous in economy in comparison with the relief valve.

Preferably, in the first aspect, the brake system further comprises a speed reduction unit interposed between the CVT output shaft and the hydraulic pump.

Therefore, the speed reduction unit transmits a speed-reduced rotation from the CVT output shaft to the hydraulic pump so as to reduce load on the hydraulic pump, thereby prolonging the life of the hydraulic pump and thereby stabilizing the braking effect of the hydraulic pump of the brake system.

Alternatively, preferably, in a second aspect, the brake system comprises a regenerative brake, an electric circuit and an electricity control linkage. The regenerative brake is driven by the rotation of the CVT output shaft so as to function as a generator or is supplied with electricity so as to function as a brake causing a magnetic resistance serving as the resistance of the brake system reducing the rotary speed of the CVT output shaft. The electric circuit is provided for recovering electricity generated by the regenerative brake functioning as the generator and to supplying electricity to the regenerative brake functioning as the brake. The hydraulic circuit includes a battery that reserves electricity generated by the regenerative brake functioning as the generator. The hydraulic circuit includes a controller that commands to supply the electricity from the battery to the regenerative brake functioning as the brake. The electricity control linkage operatively connects the accelerator manipulator to the controller.

Therefore, the brake system in the second aspect using the regenerative brake is advantageous because such an electricity control for the regenerative brake improves accuracies in judgment whether or not the brake system should cause the resistance and in adjusting the resistance caused by the brake system. Further, the vehicle using, this brake system is advantageous for saving energy because the regenerative brake also functions as the generator.

Preferably, in the second aspect, the brake system further comprises a detection means detecting a condition of the vehicle. The controller controls the electricity supply to the regenerative brake based on a detection signal from the detection means so as to adjust the magnetic pressure in correspondence to the detected condition of the vehicle.

Therefore, the controller minutely performs the selection whether or not the electricity should be supplied to the regenerative brake and the adjustment of the magnetic resistance generated by the regenerative brake serving as the braking force to reduce the rotary speed of an axle of the vehicle in correspondence to various parameters about conditions of the vehicle, e.g., an angle of a slope or a rotary speed of the axle, as well as the manipulation of the accelerator manipulator.

Preferably, in the second aspect, the brake system includes a speed reduction unit interposed between the CVT output shaft and the regenerative brake.

Therefore, the speed reduction unit transmits a speed-reduced rotation from the CVT output shaft to the regenerative brake so as to reduce the load on the regenerative brake, thereby prolonging the life of the regenerative brake and thereby stabilizing the braking effect of the regenerative brake of the brake system.

These, other and further objects, features and advantages of the invention will appear more fully in the following detailed description with reference to the attached drawings.

DETAILED DESCRIPTION OF THE INVENTION

Figure 1:
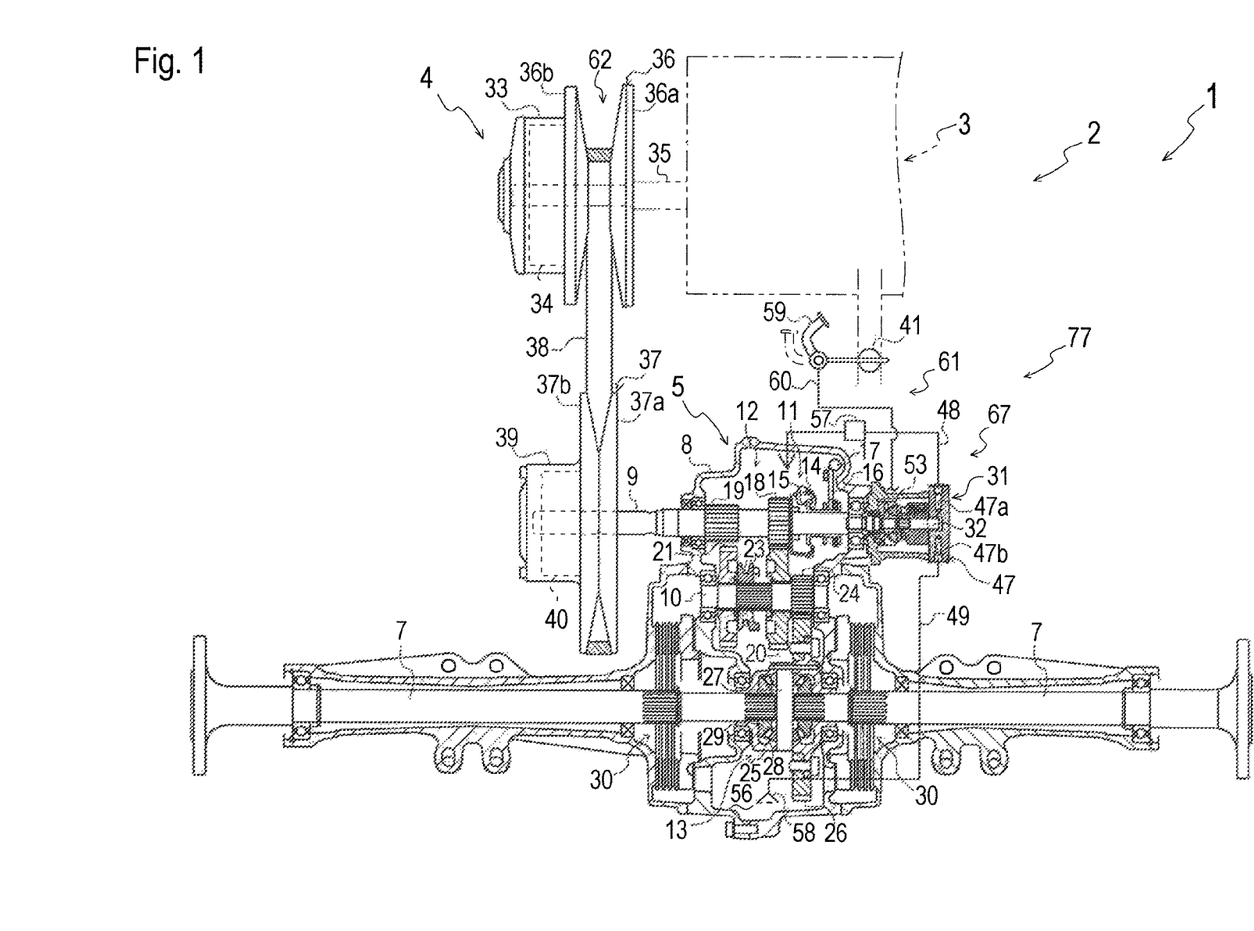
FIG. 1 is a sectional plan view of a vehicle power train 2 for a vehicle 1, provided with a hydrodynamic brake system 77.
Figure 2:
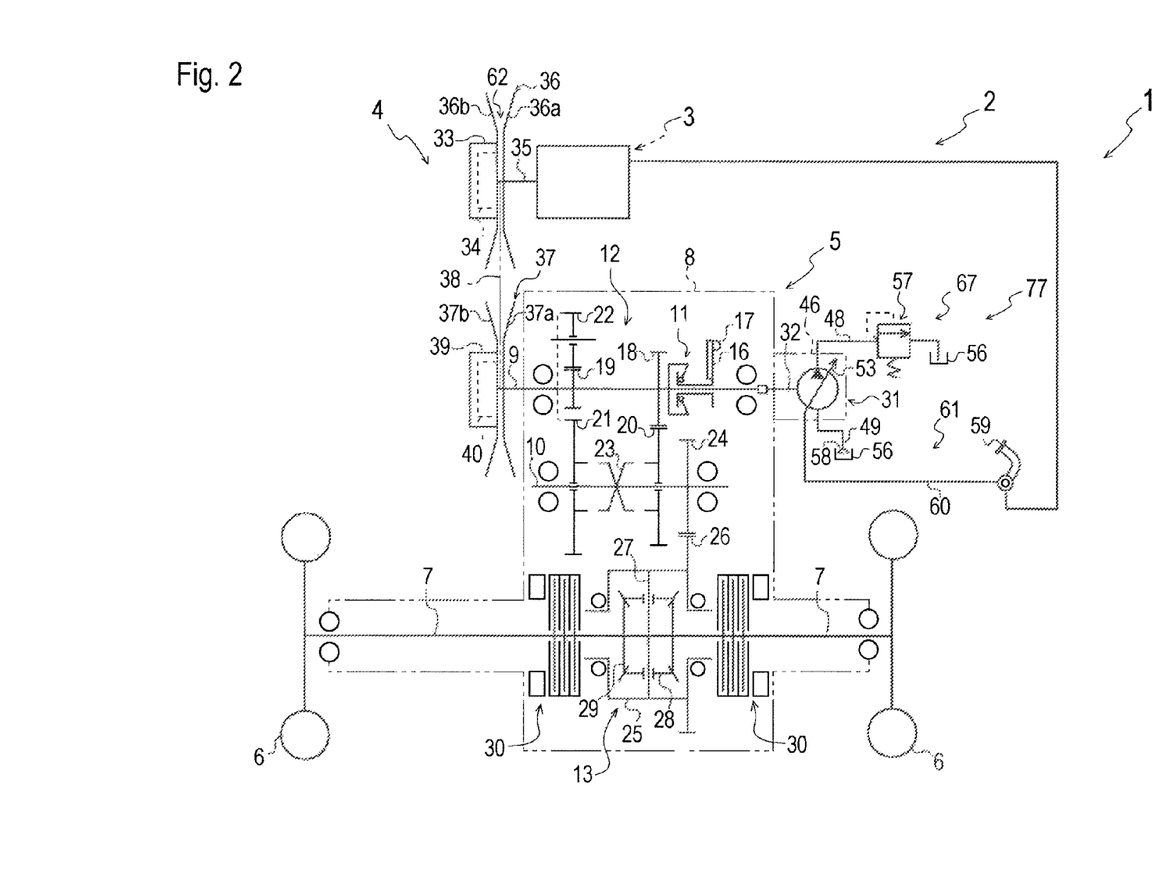
FIG. 2 is a skeleton diagram of vehicle power train 2 of FIG. 1.

Referring to FIGS. 1 and 2, an axle driving power train 2 provided with a hydrodynamic brake system 77 for a vehicle 1, e.g., a golf car or golf cart, will be described on an assumption that axle driving power train 2 shown in FIGS. 1 and 2 is representative of axle driving power train 2 illustrated in FIGS. 6 to 9 as being provided with alternative brake systems 177, 177A and 277. Axle driving power train 2 includes an engine 3 serving as a prime mover, a CVT 4, and a transaxle 5 carrying right and left axles 7. Transaxle 5 receives power from engine 3 via CVT 4. Right and left drive wheels 6 are fixed on distal ends of respective axles 7.

Transaxle 5 includes a transaxle casing 8 supporting right and left axles 7. Transaxle casing 8 incorporates a governor 11, a reverser gear transmission 12 and a differential gear unit 13 differentially connecting right and left axles 7 to each other. An output shaft 9 of CVT 4 is journalled in transaxle casing 8 so as to serve as an input shaft of reverser gear transmission 12 in transaxle 5. Hereinafter, shaft 9 is referred to as reverser input shaft 9 in description of transaxle 5, and is also referred to as CVT output shaft 9 in description of CVT 4.

Governor 11 is a centrifugal governor including a governor weight 14 and a lifter 15. Governor weight 14 is provided on reverser input shaft 9 so as to be centrifugally rotatable according to an increase of rotary speed of reverser input shaft 9. Lifter 15 is axially slidable along reverser input shaft 9 according to the rotation of governor weight 14. A governor fork 16 and a governor shaft 17 are provided in transaxle casing 8 so as to operatively connect lifter 15 to a throttle valve 41 of engine 3. Throttle valve 41 is also operatively connected to an accelerator pedal 59 serving as an accelerator manipulator. Therefore, an output rotary speed of engine 3 is controlled by depressing accelerator pedal 59 and is automatically adjusted by governor 11.

Reverser gear transmission 12 includes a reverser output shaft 10 drivingly connected to differential gear unit 13, and includes a forward traveling gear train and a backward traveling gear train interposed between reverser input shaft 9 and reverser output shaft 10, so that either the forward or backward traveling gear train is selected to transmit power from reverser input shaft 9 to reverser output shaft 10 so as to drive axles 7 by reverser output shaft 10 via differential gear unit 13.

A forward traveling driver gear 18 and a backward traveling driver gear 19 are fixed on reverser input shaft 9 in transaxle casing 8. A forward traveling driven gear 20 and a backward traveling driven gear 21 are fitted on reverser output shaft 10 so as to be rotatable relative to reverser output shaft 10. Forward traveling driver gear 18 and forward traveling driven gear 20 directly mesh with each other so as to serve as the forward traveling gear train of reverser gear transmission 12. Backward traveling driver gear 19 and backward traveling driven gear 21 mesh with each other via an idle gear 22 so that gears 19, 21 and 22 serve as the backward traveling gear train of reverser gear transmission 12.

A clutch shifter 23 is spline-fitted on reverser output shaft 10 between forward and backward traveling driven gears 20 and 21 so as to be unrotatable relative to reverser output shaft 10 and so as to be axially slidable along reverser output shaft 10. A reverser manipulator (not shown), e.g., a lever, a switch or a pedal, is provided on vehicle 1 so as to be shiftable between a forward traveling position and a backward traveling position and is operatively connected to clutch shifter 23. By setting the reverser manipulator at the forward traveling, position, clutch shifter 23 meshes with forward traveling driven gear 20 so as to drivingly connect reverser output shaft 10 to reverser input shaft 9 via the forward traveling gear train. By setting the reverser manipulator at the backward traveling position, clutch shifter 23 meshes with backward traveling driven gear 21 so as to drivingly connect reverser output shaft 10 to reverser input shaft 9 via the backward traveling gear train. The reverser manipulator may be also shiftable to a neutral position where clutch shifter 23 meshes neither forward traveling driven gear 20 nor backward traveling driven gear 21.

Differential gear unit 13 includes a differential casing 25, a bull gear 26, a differential pinion pivot shaft 27, bevel differential, pinions 28 and right and left bevel differential side gears 29. Proximal end portions of respective right and left axles 7 are supported in differential casing 25 and are fixedly provided thereon with respective bevel differential side gears 29. Differential pinion pivot shaft 27 is supported by differential casing 25 and is extended in differential casing 25 between the proximal end portions of right and left axles 7. Bevel differential pinions 28 are symmetrically provided on differential pinion pivot shaft 27 in differential casing 25 so that each of bevel differential pinions 28 meshes with both of right and left bevel differential side gears 29. Bull gear 26 is fixed on differential casing 25 so as to serve as an input gear of differential gear unit 13 and meshes with a reverser output, gear 24 fixed on reverser output shaft 10.

Right and left disc brakes 30 are provided on respective right and left axles 7 in transaxle casing 8 rightward and leftward from differential gear unit 13. A brake pedal (not shown) serving as a braking manipulator is provided on vehicle 1 and is operatively connected to right and left disc brakes 30 so that both of right and left disc brakes 30 are simultaneously applied to brake respective axles 7 by depressing the brake pedal. In this way, disc brakes 30 serve as manipulatable brakes manipulated by the brake pedal in comparison with a later-discussed hydrodynamic brake system 77 that automatically applies its braking force when accelerator pedal 59 is released from an operator's foot regardless of the operator's depression of the brake pedal.

Engine 3 has an engine output shaft 35. Engine output shaft 35 is extended to serve as an input shaft of CVT 4. Therefore, engine output shaft 35 is referred to as CVT input shaft 35 in description of CVT 4.

CVT 4 will be described with reference to FIGS. 1 to 5. CVT 4 includes a driver pulley 36, a driven pulley 37 and a V-belt 38 interposed between driver and driven pulleys 36 and 37. CVT input shaft 35 serves as a pulley shaft of driver pulley 36. CVT output shaft 9 extended outward from transaxle casing 8 serves as a pulley shaft of driven pulley 37.

Driver pulley 36 includes half pulleys. One half pulley is defined as an axial-immovable half pulley 36a that is not axially movable along CVT input shaft 35. The other half pulley is defined as an axial-movable half pulley 36b that is axially movable along CVT input shaft 35. A pitch control casing 33 incorporating a pitch controller 34 is fixed to axial-movable half pulley 36b.

Pitch controller 34 has a centrifugal weight, for example, so that pitch controller 34 functions to push axial-movable half pulley 36b toward axial-immovable half pulley 36a along CVT input shaft 35 according to the increase of the rotary speed of CVT input shaft 35. While a rotary speed N of CVT input shaft 35 (in other words, engine rotary speed N of engine 3) increases from zero to an engine idling speed NI, axial-movable half pulley 36b is distant from axial-immovable half pulley 36a so as to isolate V-belt 38 between half pulleys 36a and 36b from the rotary force of CVT input shaft 35, in other words, CVT 4 functions as disengagement action of a clutch so as to allow idling of engine 3.

When increased rotary speed N of CVT input shaft 35 exceeds engine idling speed NI, the gap between half pulleys 36a and 36b becomes small so that half pulleys 36a and 36b pinch V-belt 38 therebetween so as to transmit the rotary force of CVT input shaft 35 to V-belt 38, in other words, CVT 4 functions as engagement action of a clutch. As rotary speed N of CVT input shaft 35 exceeding idling threshold speed N increases, the gap between half pulleys 36a and 36b further reduces so as to increase the pitch diameter of V-belt 38 looped over driver pulley 36, thereby increasing the output/input speed ratio of CVT 4 that is the rotary speed of CVT output shaft 9 relative to rotary speed N of CVT input shaft 35.

Conversely, as rotary speed N of CVT input shaft 35 reduces, the gap between half pulleys 36a and 36b increases to reduce the pitch diameter of V-belt 38 looped over driver pulley 36, thereby reducing the output/input speed ratio of CVT 4. When rotary speed N of CVT input shaft 35 becomes lower than engine idling speed NI, axial-movable half pulley 36b becomes distant from axial-immovable half pulley 36a so as to isolate V-belt 38 from the rotary force of CVT input shaft 35, in other words, CVT 4 functions as the clutch-disengagement action. In this way, driver pulley 36 of CVT 4 serves as a clutch interposed between engine output shaft (CVT input shaft) 35 and reverser input shaft (CVT output shaft) 9.

Driven pulley 37 also includes half pulleys. One half pulley of driven pulley 37 is defined as an axial-immovable half pulley 37a that is not axially movable along CVT output shaft 9. The other half pulley of driven pulley 37 is defined as an axial-movable half pulley 37b that is axially movable along CVT output shaft 9. A pitch control casing 39 incorporating a pitch controller 40 is fixed to axial-movable half pulley 37b. Pitch controller 40 has a biasing means, e.g., a spring, biasing axial-movable half pulley 37b toward axial-immovable half pulley 37a. Due to this biasing force of the biasing mean of pitch controller 40, driven pulley 37 receives the driving force of V-belt 38 transmitted from CVT input shaft 35 via driver pulley 36, and a gap between half pulleys 37a and 37b is adjusted according to the change of the driving speed of V-belt 38 so as to change a pitch diameter of driven pulley 37 in correspondence to the change of the pitch diameter of driver pulley 36, thereby ensuring the change of the speed ratio of CVT 4 in correspondence to the change of rotary speed N of engine output shaft 35 of engine 3.

Further, driven pulley 37 can receive a backflow of driving force from axles 7 so as to change its pitch diameter, and so as to transmit the backflow of driving force to driver pulley 36. When driver pulley 36 receives this backflow of driving force, driver pulley 36 can function as the clutch-disengagement action so as to protect rotating CVT input shaft (i.e., engine output shaft) 35 from the backflow of driving force.

Referring to a line graph 42 shown in FIG. 4, a correlation between engine rotary speed N (i.e., rotary speed N of CVT input shaft 35) and a depression degree D of accelerator pedal 59 will be described. Once engine 3 is started, engine 3 keeps its output rotary speed N at engine idling speed NI unless accelerator pedal 59 is depressed to any depression degree D exceeding an idling limit depression degree DI. In this regard, unless depression degree D of accelerator pedal 59 does not exceed idling limit depression degree DI, driver pulley 36 of CVT 4 functions as the clutch-disengagement action as mentioned above so as to keep engine rotary speed N at engine idling speed NI. In other words, accelerator pedal 59 has an idling depression range 44 of depression degree D from zero to idling limit depression degree DI so as to keep the clutch-disengagement action of CVT 4 to allow the idling of engine 3. Further in other words, the clutch-disengagement action of CVT 4 also keeps CVT output shaft (reverser input shaft) 9 free from the idling rotation of CVT input shaft (engine output shaft) 35.

A range of depression degree D of accelerator pedal 59 exceeding idling limit depression degree DI is defined as a propelling depression range 45 of accelerator pedal 59. While depression degree D of accelerator pedal 59 exists in propelling depression range 45, i.e., while depression degree D changes between idling limit depression degree DI and a maximum depression degree, engine rotary speed N is changed between engine idling speed NI and a maximum engine rotary speed to change the travel speed of vehicle 1 according to the, change of depression degree D of accelerator pedal 59.

As mentioned above, while depression degree D of accelerator pedal 59 exists in, idling depression range 44, CVT 4 functions as the clutch-disengagement action. In this state, CVT 4 cannot transmit the idling torque of engine output shaft (CVT input shaft) 35 to reverser input shaft (CVT output shaft) 9 so as to sufficiently reduce the rotary speed of reverser input shaft 9 when vehicle 1 descends a slope. In other words, CVT 4 cannot function as an engine brake. To compensate for the lack of engine brake function, vehicle 1 is provided with a hydrodynamic brake system 77 for applying a braking force to reverser input shaft 9 when CVT 4 functions as the clutch-disengagement action.

Referring to FIGS. 1 to 4, hydrodynamic brake system 77 will be described. In this regard, opposite sides will be referred to as "proximal" and "distal" on the assumption that one side closer to transaxle 5 is defined as "proximal" and the other side farther from transaxle 5 is defined as "distal".

Hydrodynamic brake system 77 includes a variable displacement hydraulic pump 31, a pump control linkage 61 and a hydraulic circuit 67. As best understood from FIG. 3, hydraulic pump 31 includes a pump shaft 32, a pump casing 46, a fluid duct block 47, a cylinder block 50, plungers 51, shoes 52, a movable swash plate 53, a swash plate holder 54 and a spring 55.

Figure 3:
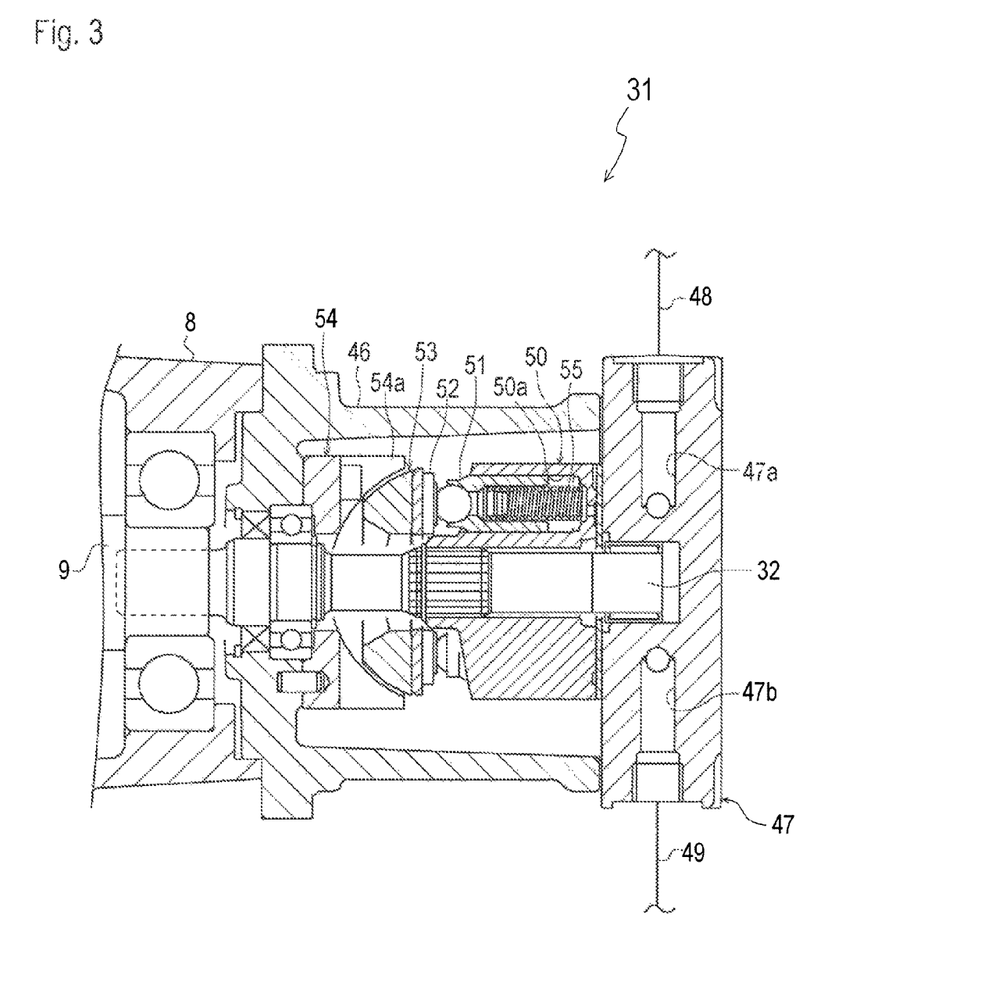
FIG. 3 is a sectional plan view of a variable displacement hydraulic pump 31 of hydrodynamic brake system 77.

Pump casing 46 is fixed at a proximal end thereof to a side end portion of transaxle casing 8 of transaxle 5 laterally opposite CVT 4 and is fixed at a distal end thereof to fluid duct block 47. Pump shaft 32 is disposed in pump casing 46 and is journalled by pump casing 46 via a bearing. A proximal axial end of pump shaft 32 projects into transaxle casing 8 and is coaxially joined to an end portion of reverser input shaft 9 so as to be rotatably integrated with reverser input shaft 9. A distal axial end of pump shaft 32 is journalled in fluid duct block 47.

Pump casing 46 is formed therein with a distally open pump chamber, and a vertical surface of fluid duct block 47 fixed to the distal end of pump casing 46 closes the distal open end of the pump chamber so as to define the distal end of the pump chamber. Cylinder block 50 is disposed in the pump chamber in pump casing 46. Cylinder block 50 is fitted on pump shaft 32 so as to be rotatably integrated with pump shaft 32 and is fitted to the vertical surface of fluid duct block 47 (via a port plate or nothing) so as to be slidably rotatable relative to fluid duct block 47. Cylinder block 50 is formed therein with axial cylinder bores 50a that are aligned around pump shaft 32. Plungers 51 are axially reciprocally slidably fitted in respective cylinder bores 50a via respective springs 55.

Swash plate holder 54 is disposed in the pump chamber in pump casing 46 and is fixed to a proximal side portion of pump casing 46 defining the proximal end of the pump chamber. Movable swash plate 53 is disposed in the pump chamber and is fitted to swash plate holder 54 so as to be slidably rotatable relative to swash plate holder 54. Pump shaft 32 is passed through movable swash plate 53 and swash plate holder 54 so as to be rotatably free from movable swash plate 53 and swash plate holder 54. Shoes 52 fitted on heads of respective plungers 51 are pressed against movable swash plate 53 by the biasing forces of springs 55.

As shown in FIG. 2, hydraulic pump 31 is provided with hydraulic circuit 67 for supplying fluid to hydraulic pump 31 and for releasing and recovering fluid delivered from hydraulic pump 31. Hydraulic circuit 67 includes a delivery fluid passage 48, a suction fluid passage 49, a fluid tank 56, a relief valve 57 and a filter 58. For example, a fluid sump serving as fluid tank 56 is provided in transaxle casing 8 to reserve lubricating fluid for governor 11, reverser gear transmission 12, differential gear unit 13 and others in transaxle casing 8. Delivery fluid passage 48 is extended from hydraulic pump 31 to fluid tank 56 so as to release fluid delivered from fluid-delivery cylinder bores 50a of hydraulic pump 31 to fluid tank 56 via relief valve 57. Suction fluid passage 49 is extended from filter 58 to hydraulic pump 31 so as to supply fluid from fluid tank 56 via filter 58 to fluid-suction cylinder bores 50a of hydraulic pump 31.

Relief valve 57 having a fixed relief pressure is adapted to maintain a pressure of fluid delivered from hydraulic pump 31. In this regard, the "relief pressure" is defined as a pressure of hydraulic fluid flow to open a relief valve. In other words, once a hydraulic fluid flow is increased to open the relief valve, the hydraulic fluid flow has a pressure equal to the relief pressure of the relief valve while the relief valve is open.

Fluid ducts 47a and 47b are formed in fluid duct block 47. Fluid duct 47a is open at the vertical surface of fluid duct block 47 so as to be fluidly connected to fluid-delivery cylinder bores 50a in cylinder block 50. Fluid duct 47b is open at the vertical surface of fluid duct block 47 so as to be fluidly connected to fluid-suction cylinder bores 50a in cylinder block 50. In this regard, the rotary direction of reverser input shaft 9 is constant and movable swash plate 53 is tiltable in only one direction from its neutral position so that fluid-delivery cylinder bores 50a are constantly defined as cylinder bores 50a for delivering fluid to fluid duct 47a and fluid-suction cylinder bores 50a are constantly defined as cylinder bores 50a for sucking fluid from fluid duct 47b.

Fluid ducts 47a and 47b have outer open ends. Fluid pipes, for example, are extended from the outer open ends of respective fluid ducts 47a and 47b, so that fluid duct 47a and the fluid pipe extended from the outer open end of fluid duct 47a constitute delivery fluid passage 48, and fluid duct 47b and the fluid pipe extended from the outer open end of fluid duct 47b constitute suction fluid passage 49.

Pump control linkage 61 includes accelerator pedal 59, movable swash plate 53 and a link 60 operatively connecting accelerator pedal 59 to movable swash plate 53. Pump control linkage 61 is configured so that a depression of accelerator pedal 59 for changing engine rotary speed N also changes a tilt angle of movable swash plate 53 (from a neutral position of movable swash plate 53).

Due to hydrodynamic brake system 77 configured as mentioned above, when reverser input shaft 9 rotates, pump shaft 32 rotates together with reverser input shaft 9 so that hydraulic pump 31 performs a pumping action, i.e., hydraulic pump 31 delivers fluid to fluid tank 56 via delivery fluid passage 48 and relief valve 57, and sucks fluid from fluid tank 56 via suction fluid passage 49 and filter 58. The preset relief pressure of relief valve 57 (normally defined by a spring) defines a hydraulic pressure of the hydraulic fluid flow caused by the pumping action of hydraulic pump 31, and this hydraulic pressure resists the rotation of pump shaft 32, reverser input shaft 9, and axles 7 (with drive wheels 6) drivingly connected to reverser input shaft 9 via the selected forward or backward traveling gear train and differential gear unit 13. Hereinafter, this hydraulic pressure is referred to as resistant hydraulic pressure of hydraulic pump 31.

Figure 4:
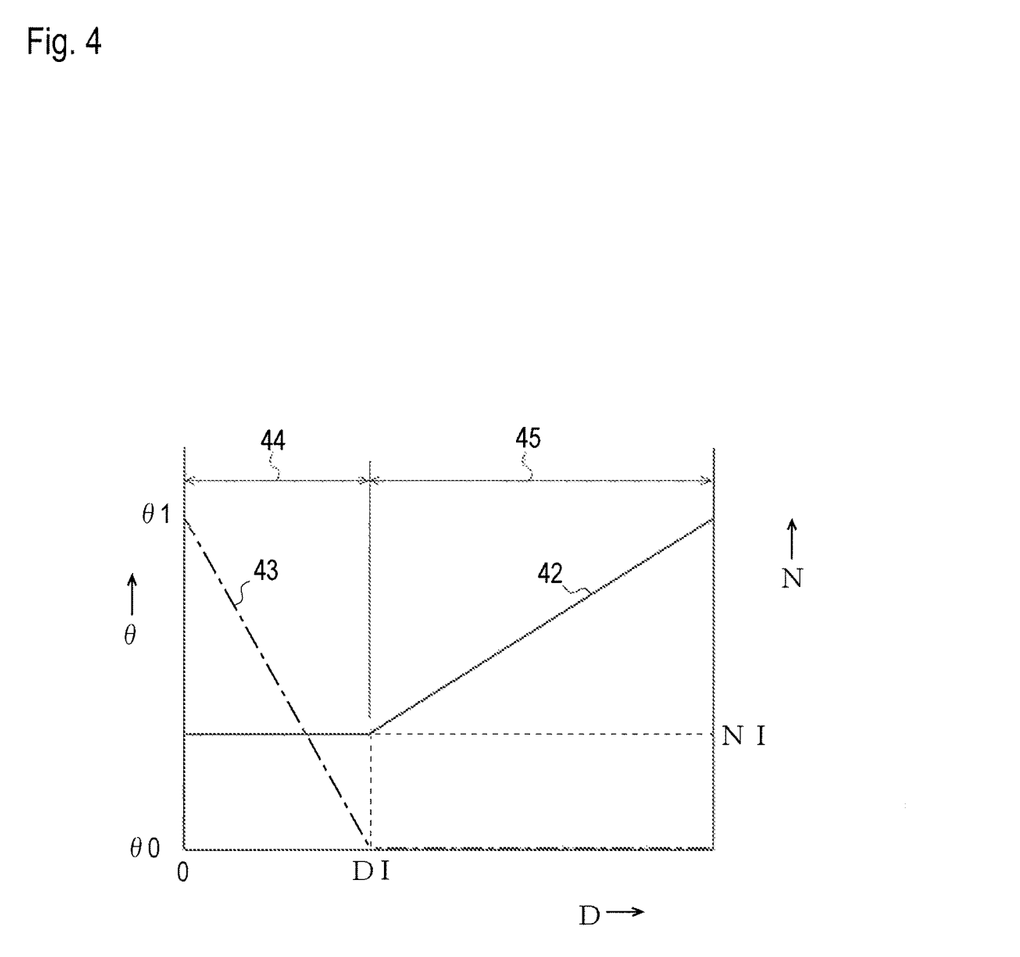
FIG. 4 illustrates a line graph 42 of engine rotary speed N relative to depression degree D of an accelerator pedal 59 and a line graph 43 of a tilt angle Θ of a movable swash plate 53 of hydraulic pump 31 relative to depression degree D of accelerator pedal 59.

A line graph 43 in FIG. 4 indicates a correlation between depression degree D of accelerator pedal 59 and tilt angle $\Theta$ of movable swash plate 53. While depression degree D of accelerator pedal 59 exists in propelling depression range 45 to determine engine rotary speed N that exceeds engine idling speed NI so as to define the travel speed of vehicle 1, tilt angle $\Theta$ of movable swash plate 53 is kept at a normal tilt angle $\Theta_0$ so that the hydraulic fluid flow caused by hydraulic pump 31 having movable swash plate 53 at normal tilt angle $\Theta_0$ is insufficient to open relief valve 57, i.e., relief valve 57 is kept closed to prevent hydraulic pump 31 from causing, a hydraulic fluid flow having the resistant hydraulic pressure of hydraulic pump 31, thereby ensuring smooth rotation of axles 7 driven by engine 3 via CVT 4. Conceivable tilt angle $\Theta$ as normal tilt angle $\Theta_0$ is zero or very small. If normal tilt angle $\Theta_0$ is zero, the setting of movable swash plate 53 at normal tilt angle $\Theta_0$ means that movable swash plate 53 is disposed at its neutral position so as to surely cancel the pumping action of hydraulic pump 31 causing the hydraulic fluid flow while pump shaft 32 rotates.

Here, vehicle 1 is assumed to descend a slope. In this situation, an operator releases accelerator pedal 59 from his/her foot so as to reduce the travel speed of vehicle 1, i.e., the rotary speed of drive wheels 6. When depression degree D of accelerator pedal 59 is shifted from propelling depression range 45 into idling depression range 44, engine rotary speed N becomes engine idling speed NI so as to reduce the traveling speed of descending vehicle 1, however, CVT 4 functions as the clutch-disengagement action so that the rotation of reverser input shaft 9 free from the torque of engine output shaft 35 tends to follow gravitic rotation of drive wheels 6 of descending vehicle 1 that may be undesirably fast or may be unexpectedly accelerated. Therefore, in correspondence to the clutch-disengagement action of CVT 4, movable swash plate 53 is tilted to increase its tilt angle Θ from normal tilt angle Θ0 to a braking tilt angle Θ1 so as to realize the pumping action of hydraulic pump 31, thereby causing the resistant hydraulic pressure of hydraulic pump 31 that functions similar to an engine brake to prevent reverser input shaft 9 and drive wheels 6 from being unexpectedly accelerated by the gravity.

Incidentally, braking tilt angle Θ1 may not be the maximum of tilt angle Θ in the entire range of tilt angle Θ. The importance for setting braking tilt angle Θ1 of movable swash plate 53 is that braking tilt angle Θ1 should be sufficient to open relief valve 57 so as to make hydraulic pump 31 cause a hydraulic fluid flow having the resistant hydraulic pressure defined by relief valve 57. Further, a portion of line graph 43 in idling depression range 44 is illustrated as a sloped straight line whose ends defined as tilt angles Θ0 and Θ1 are disposed at 0 and DI of depression degrees D, respectively. Such a gradual increase of tilt angle Θ from normal tilt angle Θ0 to braking tilt angle Θ1 according to reduction of depression degree D corresponds to the gradual clutch-disengagement action of driver pulley 36 of CVT 4, thereby preventing hydraulic pump 31 from undesirably suddenly acting as a brake reducing the rotary speed of reverser input shaft 9. However, this is only an example. For example, the increase of tilt angle Θ from normal tilt angle Θ0 may start at depression degree D that is smaller than idling limit depression degree DI, or increased tilt angle Θ may reach braking tilt angle Θ1 before reduced depression degree D reaches zero. The most importance for controlling movable swash plate 53 of hydraulic pump 31 in correspondence to depression of accelerator pedal 59 in idling depression range 44 is to shift tilt angle Θ of movable swash plate 53 from normal tilt angle Θ0 to braking tilt angle Θ1 in correspondence to the clutch-disengagement action of CVT 4. In other words, movable swash plate 53 serves as a switch that is shifted between normal tilt angle Θ0 to cancel the pumping action of hydraulic pump 31 causing the hydraulic fluid flow having the resistant hydraulic pressure and braking tilt angle Θ1 to make hydraulic pump 31 cause the hydraulic fluid flow having the resistant hydraulic pressure.

As mentioned above, the relief pressure of relief valve 57 defines the resistant hydraulic pressure of hydraulic pump 31. Vehicle 1 can be equipped with any relief valve 57 having an appropriate relief pressure for defining the resistant hydraulic pressure of hydraulic pump 31 functioning as an engine brake for reducing the rotary speed of axles 7 and drive wheels 6 when CVT 4 functions as the clutch-disengagement action.

Figure 5:
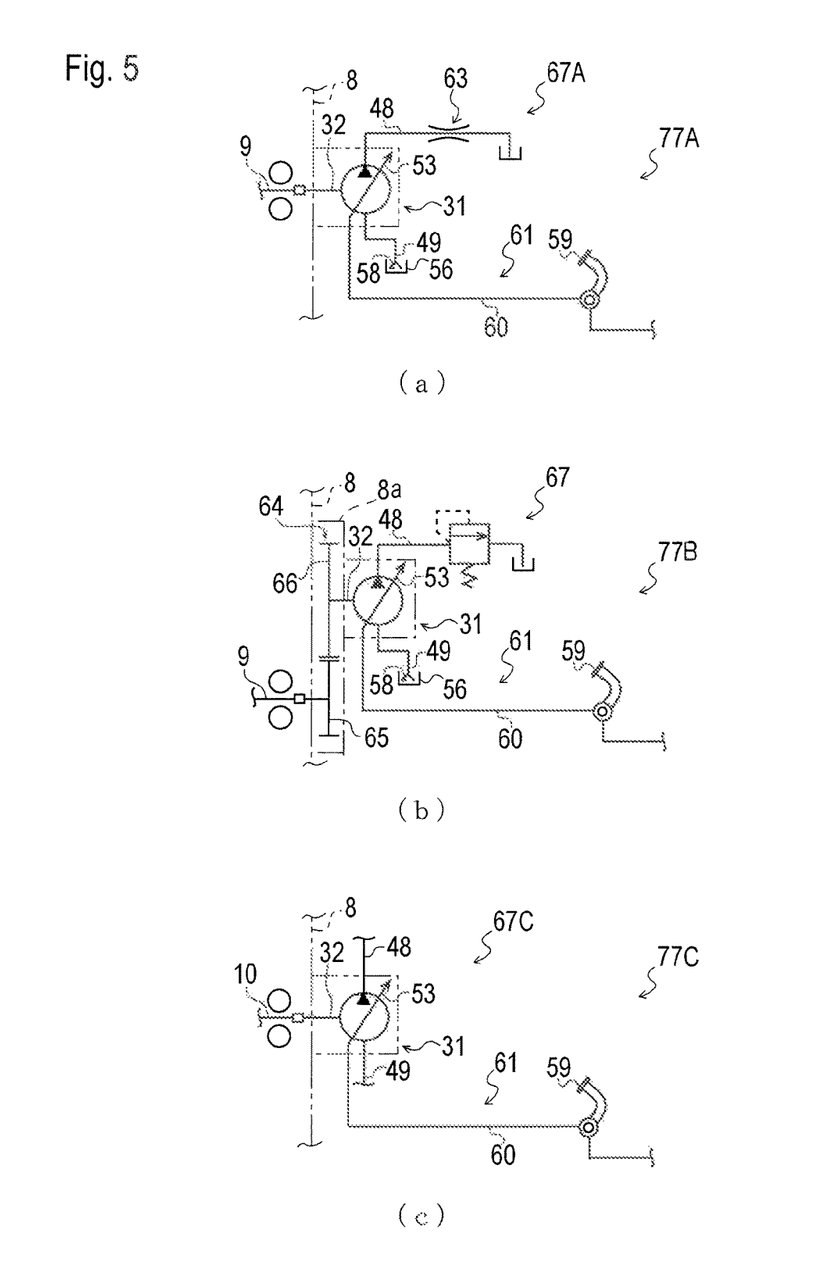
FIG. 5(a) is a skeleton diagram of an alternative hydrodynamic brake system 77A.
FIG. 5(b) is a skeleton diagram of an alternative hydrodynamic brake system 77B.
FIG. 5(c) is a skeleton diagram of an alternative hydrodynamic brake system 77C.

Alternative embodiments of hydrodynamic brake system 77 including hydraulic pump 31 shown in FIGS. 5(*a*), 5(*b*) and 5(*c*) will be described. Referring to FIG. 5(*a*), an alternative hydrodynamic brake system 77A includes an alternative hydraulic circuit 67A that is the same as hydraulic circuit 67 except for a throttle (orifice) 63 provided on delivery fluid passage 48 so as to replace relief valve 57 of hydraulic circuit 67. The opening degree of throttle 63 replaces the relief pressure of relief valve 57 to define the resistant hydraulic pressure of hydraulic pump 31. In this embodiment, the opening degree of throttle 63 is fixed.

Referring to FIG. 5(*b*), an alternative hydrodynamic brake system 77B includes a reduction gear train 64 interposed between reverser input shaft 9 and pump shaft 32 so as to radially offset pump shaft 32 from reverser input shaft 9 in comparison with hydrodynamic brake system 77 shown in FIGS. 1 to 3 including pump shaft 32 directly joined coaxially to reverser input shaft 9. In this regard, reduction gear train 64 includes a diametrically small gear 65 and a diametrically large gear 66 that mesh with each other. Diametrically small gear 65 is fixed to reverser input shaft 9, and diametrically large gear 66 is fixed to pump shaft 32.

A reduction gear casing 8*a* incorporating gears 65 and 66 of reduction gear train 64 is fixed on the side end portion of transaxle casing 8 so as to coaxially join a gear shaft of gear 65 to reverser input shaft 9 in transaxle casing 8, and is extended along the side end portion of transaxle casing 8 so that pump casing 46 of hydraulic pump 31 radially offset from reverser input shaft 9 is mounted on reduction gear casing 8*a* so as to fix pump shaft 32 of hydraulic pump 31 to gear 66 in reduction gear casing 8*a*.

Reduction gear train 64 reduces the rotary speed of pump shaft 32 to a level lower than reverser input shaft 9 so as to reduce the load on hydraulic pump 31, thereby prolonging the life of hydraulic pump 31 and stabilizing the function of hydraulic pump 31.

Referring to FIG. 5(*c*), an alternative hydrodynamic brake system 77C has pump shaft 32 coaxially joined to reverser output shaft 10. Reverser output shaft 10 rotates in either of opposite directions depending on whether clutch shifter 23 meshes with forward traveling driven gear 20 or backward traveling driven gear 21. Therefore, each of fluid ducts 47*a* and 47*b* in fluid duct block 47 serves as either the delivery fluid duct or the suction fluid duct depending on which direction reverser output shaft 10 rotates in. In this regard, hydrodynamic brake system 77C includes an alternative hydraulic circuit 67C in which each of fluid passages 48 and 49 including respective fluid ducts 47*a* and 47*b* is provided with both relief valve 57 and filter 58 so as to be able to serve as either the delivery fluid passage or the suction fluid passage.

Incidentally, in FIG. 5(*c*), relief valves 57 and filters 58 for respective fluid passages 48 and 49 and fluid tank 56 fluidly connected to fluid passages 48 and 49 are omitted so that only parts of fluid passages 48 and 49 are illustrated as being extended from two ports of hydraulic pump 31 and designated by the reference numeral "67C" defining the above-mentioned configuration of hydraulic circuit 67C.

Hydrodynamic brake systems 77B and 77C are advantageous if an external space of transaxle casing 8 adjacent to the axial end of reverser input shaft 9 is too narrow to have pump casing 46 of hydraulic pump 31 attached to the side end portion of transaxle casing 8 to coaxially join pump shaft 32 to reverser input shaft 9. More specifically, pump casing 46 of hydraulic pump 31 in hydrodynamic brake system 77B can be offset from reverser input shaft 9 in any radial direction from reverser input shaft 9 if reduction gear casing 8*a* incorporating reduction gear train 64 can be extended in any radial direction from reverser input shaft 9.

Pump casing 46 of hydraulic pump 31 of hydrodynamic brake system 77C can be mounted on only the side end portion of transaxle casing 8 adjacent to reverser output shaft 10 so as to coaxially join pump shaft 32 to reverser output shaft 10 as shown in FIG. 5(*c*). Alternatively, hydrodynamic brake system 77C configured to coaxially join pump shaft 32 to reverser output shaft 10 may be provided on its fluid passages 48 and 49 with throttles (orifices) 63 replacing relief valves 57 and/or may be provided with reduction gear train 64 interposed between reverser output shaft 10 and pump shaft 32 if pump shaft 32 can be laterally offset from reverser output shaft 10.

Figure 6:
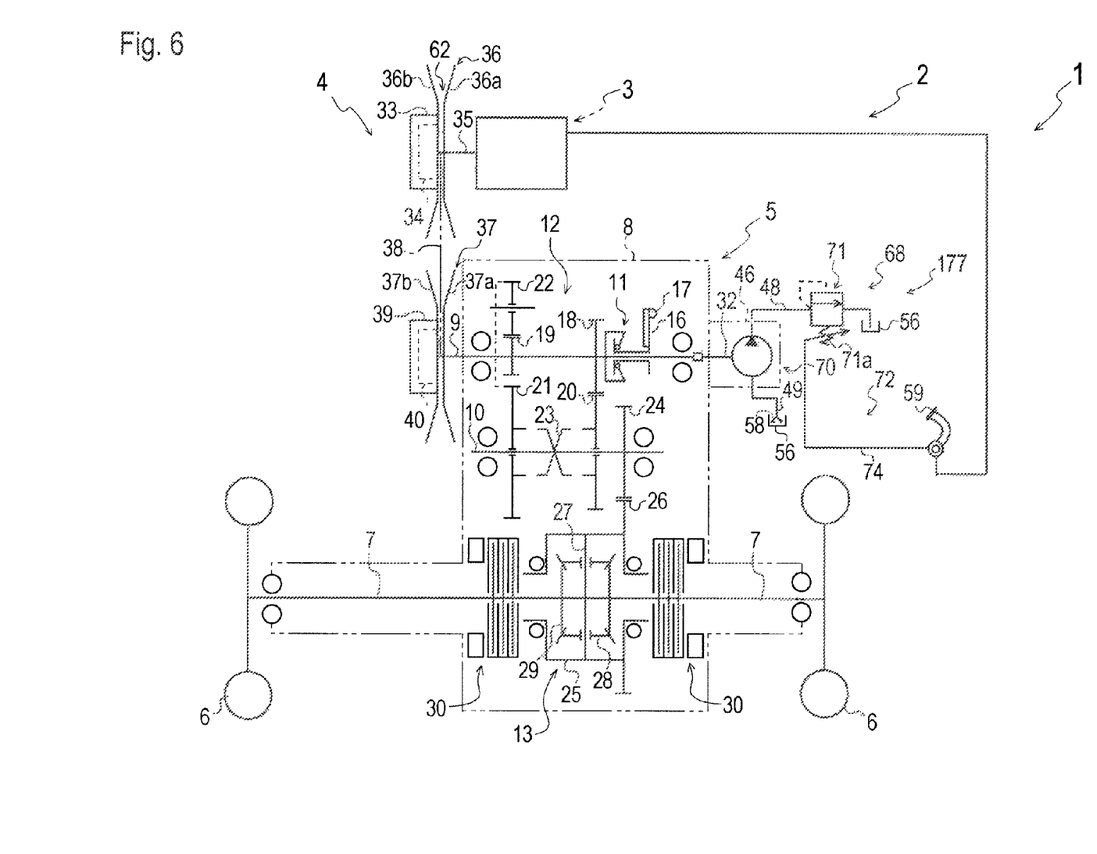
FIG. 6 is a skeleton diagram of axle driving power train 2 provided with an alternative hydrodynamic brake system 177.

Referring to FIG. 6, an alternative hydrodynamic brake system 177 will be described. Hydrodynamic brake system 177 includes a fixed displacement hydraulic pump 70, a hydraulic circuit 68 using a relief valve 71 having a variable relief pressure, and a hydraulic pressure control linkage 72 for controlling the relief pressure of relief valve 71 according to depression of accelerator pedal 59. Therefore, hydrodynamic brake system 177 uses the variable relief pressure of relief valve 71 to change the hydraulic pressure of fluid caused by pumping action of, hydraulic pump 70 resisting the rotation of reverser input shaft 9 and pump shaft 32 (hereinafter simply referred to as "resistant hydraulic pressure of hydraulic pump 70"), while the hydraulic fluid flow caused by hydraulic pump 70 is constant.

Any hydraulic pump having a fixed displacement, e.g., an axial plunger type hydraulic pump having a fixed swash plate or a trochoid gear pump, may serve as fixed displacement hydraulic pump 70. Hydraulic circuit 68 supplies fluid from fluid tank 56 to hydraulic pump 70 via filter 58 and suction fluid passage 49 and releases fluid delivered from hydraulic pump 70 to fluid tank 56 via relief valve 71, similar to hydraulic circuit 67 of hydrodynamic brake system 77, except for relief valve 71 having the variable relief pressure in comparison with relief valve 57 having the fixed relief pressure in hydraulic circuit 67.

Relief valve 71 includes a spring 71a that biases relief valve 71 in its closing direction. Spring 71a has an initial compression allowance degree defining the relief pressure of relief valve 71. Further, spring 71a is configured to be able to change the initial compression allowance degree. In this regard, the "initial compression allowance degree" defines an initial compression state of spring 71a from which spring 71a has to be compressed to a degree equal to the initial compression allowance degree so as to open relief valve 71. Therefore, as the initial compression allowance degree of spring 71a increases, the hardness of opening relief valve 71 increases so as to increase the pressure of hydraulic fluid flow caused by hydraulic pump 70 once relief valve 71 being opened.

This variable hardness of opening relief valve 71 is defined as the variable resistant hydraulic pressure of hydraulic pump 70.

Relief valve 71, accelerator pedal 59 and a link 74 operatively connecting accelerator pedal 59 to relief pressure setting spring 71a of relief valve 71 constitute hydraulic pressure control linkage 72 of hydrodynamic brake system 177 for changing the initial compression allowance degree of spring 71a according to change of depression degree D of accelerator pedal 59. Link 74 includes a piston, for example, that is activated to change the initial compression allowance degree of spring 71a so as to correspond to depression degree D of accelerator pedal 59. Therefore, an operator can adjust, depression degree D of accelerator pedal 59 to adjust the resistant hydraulic pressure of hydraulic pump 70, i.e., the braking force of the hydraulic fluid flow caused by hydraulic pump 70 reducing the rotary speed of pump shaft 32, reverser input shaft 9 and axles 7 drivingly connected to reverser input shaft 9.

Hydraulic pressure control linkage 72 may be configured to realize any conceivable correlation between the relief pressure of relief valve 71 (i.e., the initial compression allowance degree of spring 71a) and depression degree D of accelerator pedal 59. For example, while depression degree D of accelerator pedal 59 exists in propelling depression range 45 (see FIG. 4), the initial compression allowance degree of spring 71a is zeroed, i.e., spring 71a cannot be compressed further from its maximum compression degree, so that relief valve 71 is initially open fully so as to allow fluid delivered from hydraulic pump 70 to flow therethrough with no hardness of opening relief valve 71, whereby the hydraulic fluid flow caused by hydraulic pump 70 has no resistant hydraulic pressure (as a braking force) against the rotation of pump shaft 32, reverser input shaft 9 and axles 7 drivingly connected to reverser input shaft 9.

On the other hand, for example, when depression degree D of accelerator pedal 59 exists in idling depression range 44 (see FIG. 4), the hydraulic fluid flow caused by hydraulic pump 70 receives a resistance defined by the relief pressure of relief valve 71, i.e., the initial compression allowance degree of spring 71a that is defined by depression, degree D of accelerator pedal 59, and this resistance becomes the resistant hydraulic pressure of hydraulic pump 70 serving as a braking force to reduce the rotary speed of pump shaft 32, reverser input shaft 9 and axles 7 drivingly connected to reverser input shaft 9. An operator can adjust the initial compression allowance degree of spring 71a by adjusting depression degree D of accelerator pedal 59 so as to adjust the resistant hydraulic pressure of hydraulic pump 70, i.e., the braking force of the hydraulic fluid flow caused by hydraulic pump 70 to reduce the rotary speed of pump shaft 32, reverser input shaft 9 and axles 7 drivingly connected to reverser input shaft 9.

Figure 7:
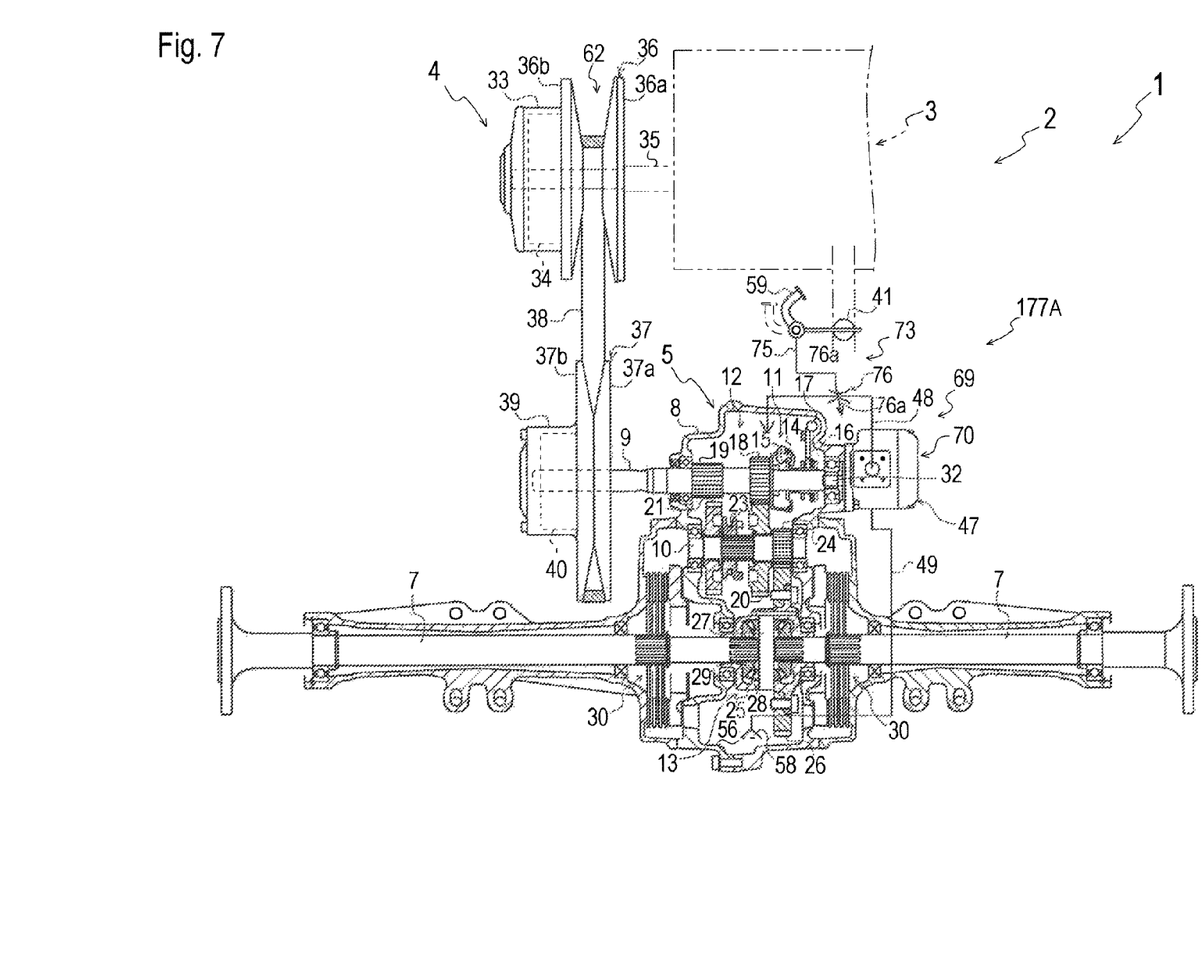
FIG. 7 is a sectional, plan view of axle driving power train 2 provided with an alternative hydrodynamic brake system 177A.
Figure 8:
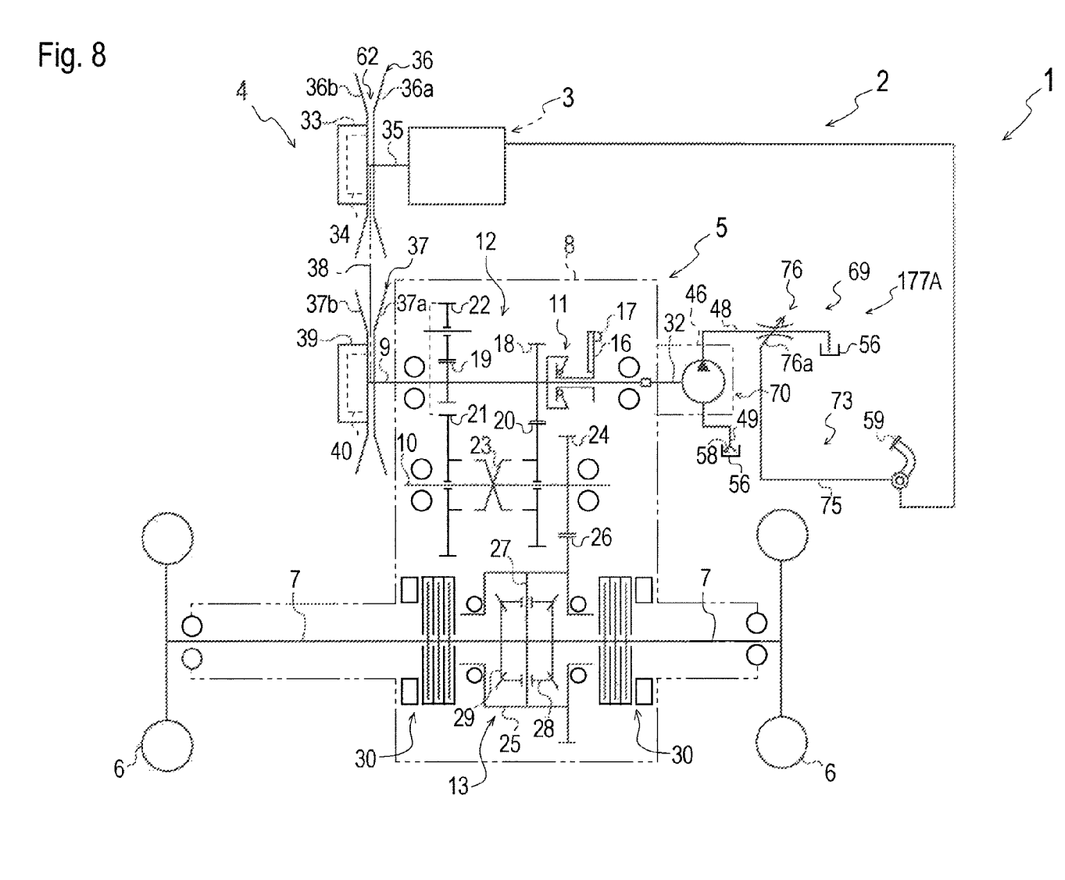
FIG. 8 is a skeleton diagram of axle driving power train 2 provided with hydrodynamic brake system 177A.

Referring to FIGS. 7 and 8, an alternative hydrodynamic brake system 177A having fixed displacement hydraulic pump 70 is similar to hydrodynamic brake system 177 except that hydrodynamic brake system 177A includes an alternative hydraulic circuit 69 and an alternative hydraulic pressure control linkage 73. Hydraulic circuit 69 is similar to hydraulic circuit 67 except for a variable throttle (orifice) 76 provided on delivery fluid passage 48. Throttle 76 has a throttle adjuster 76a for adjusting a throttling degree of throttle 76. Throttle adjuster 76a is operatively connected to accelerator pedal 59 via a link 75. Accelerator pedal 59, throttle adjuster 76a of throttle 76 and link 75 constitute hydraulic pressure control linkage 73 for controlling the throttling degree of throttle 76 according to change of depression degree D of accelerator pedal 59.

The variable throttling degree of throttle 76 defined by throttle adjuster 76a is similar to the variable relief pressure of relief valve 71 defined by spring 71a whose initial compression allowance degree is adjustable. Therefore, the above-mentioned description of hydrodynamic brake system 177 is adapted, as described for hydrodynamic brake system 177A on the assumption that variable throttle 76 having throttle adjuster 76a replaces relief valve 71 having spring 71a.

Figure 9:
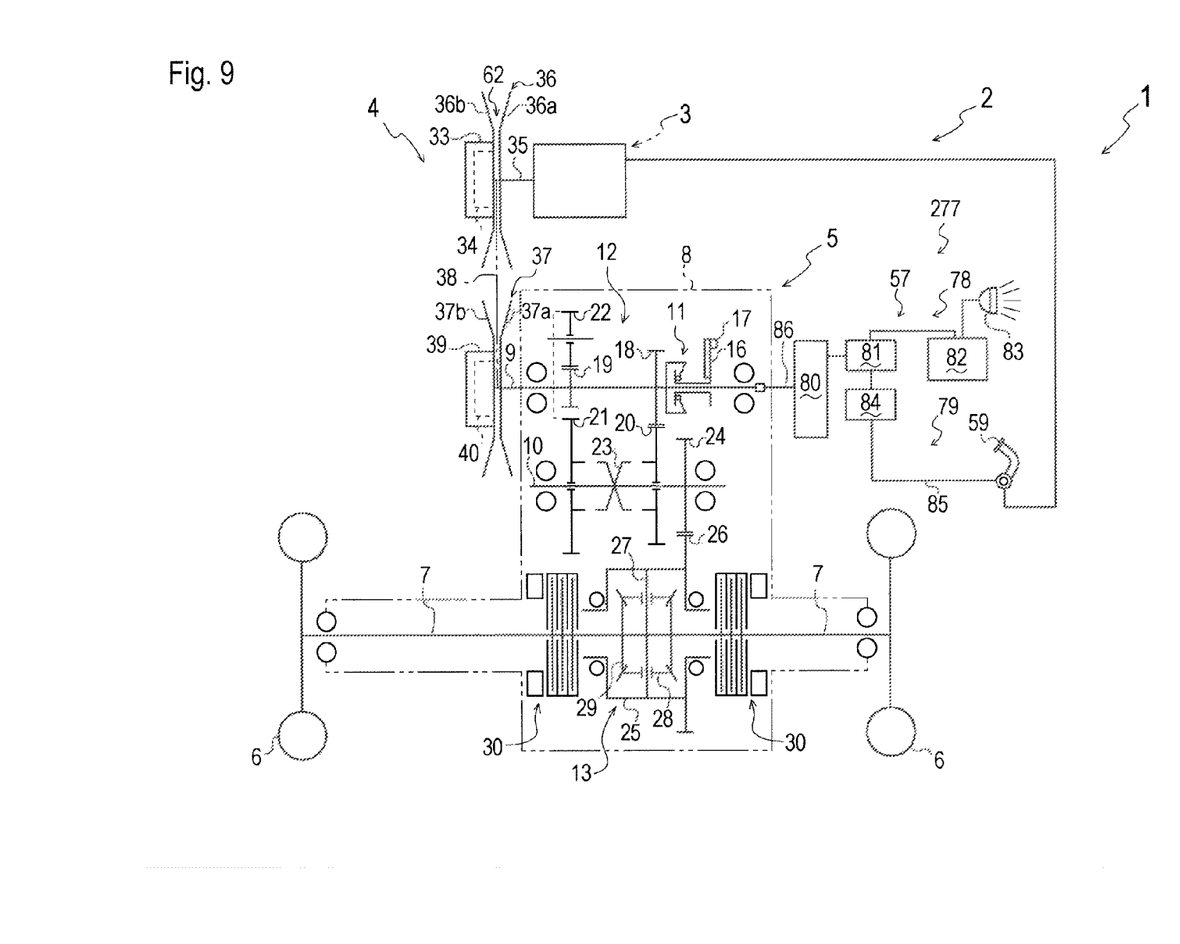
FIG. 9 is a skeleton diagram of axle driving power train 2 provided with an alternative electromagnetic brake system 277.

Referring to FIG. 9, an electromagnetic brake system 277 includes an electric circuit 78, an electricity control linkage 79 and a regenerative brake 80. Regenerative brake 80 includes an armature that functions as rotation resistance for reducing the rotary speed of reverser input shaft 9. Regenerative brake 80 includes an input shaft 86 coaxially joined to reverser input shaft 9 so as to be rotatably integrated with reverser input shaft 9. While depression degree D of accelerator pedal 59 exists in propelling depression range 45, regenerative brake 80 functions as a generator that is driven by rotating reverser input shaft 9 so as to generate electric power. While depression degree D of accelerator pedal 59 exists in idling depression range 44, regenerative brake 80 functions as a brake for reducing the rotary speed of reverser input shaft 9, thereby reducing the rotary speed of drive wheels 6.

Regenerative brake 80 is provided with electric circuit 78 including, an AC/DC converter 81, a battery 82 and a controller 84. An electric output device 83, e.g., a light, is electrically connected to controller 84. Controller 84, accelerator pedal 59 and a link 85 electrically connecting accelerator pedal 59 to controller 84 constitute electricity control linkage 79 of electromagnetic brake system 277.

When accelerator pedal 59 is depressed to make regenerative brake 80 function as the generator, AC/DC converter 81 converts an alternating current generated from regenerative brake 80 into a direct current, and battery 82 stores the direct current that is used for activating electric output device 83. When accelerator pedal 59 is depressed to make regenerative brake 80 function as the brake, controller 84 transmits a brake signal to AC/DC converter 81. Due to the brake signal, AC/DC converter 81 converts the direct current from battery 82 into an alternating current, and supplies the alternating current to regenerative brake 80 so as to increase a magnetic resistance against the armature of regenerative brake 80, thereby reducing the rotary speed of reverser input shaft 9.

Regenerative brake 80 may be used as an electric motor for driving reverser input shaft 9 while engine 3 is stationary. In this regard, vehicle 1 may be equipped with a switch or another manipulator for selecting the use of regenerative brake 80 as the electric motor for driving reverser input shaft 9. For example, when vehicle 1 is placed in a showroom, an operator can turn on such a switch to drive regenerative brake 80 as the electric motor while maintaining the stationary state of engine 3 so that vehicle 1 can travel for demonstration silently and with no emission in the showroom. Incidentally, in this state, CVT 4 serves as the disengaged clutch to isolate engine 3 from the rotation of reverser input, shaft 9 with regenerative brake 80.

Alternatively, each of brake systems 177, 177A and 277 may be provided with a reduction gear train interposed between reverser input shaft 9 and pump shaft 32 of hydraulic pump 70 or input shaft 86 of regenerative brake 80, similar to hydrodynamic brake system 77B shown in FIG. 5(b) having reduction gear train 64. Alternatively, each of brake systems 177, 177A and 277 may be configured to coaxially join pump shaft 32 of hydraulic pump 70 or input shaft 86 of regenerative brake 80 to reverser output shaft 10, similar to hydrodynamic brake system 77C shown in FIG. 5(c).

Alternatively, each of brake systems 77, 77A, 77B, 77C, 177, 177A and 277 may be provided with an automatic control system for controlling its braking force for reducing the rotary speed of axles 7 based on detection of conditions of vehicle 1. For example, vehicle 1 is provided with a slope sensor and a speed sensor. The slope sensor detects whether or not vehicle 1 is on a slope. The speed sensor detects the rotary speed of at least one axle 7. Due to detection signals from the slope sensor and the speed sensor, if a controller recognizes that vehicle 1 descends a slope at a speed exceeding a target speed, the controller commands an actuator to control movable swash plate 53 of hydraulic pump 31, spring 71a of relief valve 71, throttle adjuster 76a of throttle 76 or AC/DC converter 81, thereby causing brake system 77, 77A, 77B, 77C, 177, 177A or 277 to apply a brake force for reducing the rotary speed of reverser input shaft 9 or reverser output shaft 10, i.e., the rotary speed of axles 7 with drive wheels 6.

If hydrodynamic brake system 77 (77A, 77B or 77C) having variable displacement hydraulic pump 31 employs the detection of various conditions of vehicle 1, tilt angle Θ of movable swash plate 53 is finely controlled in correspondence of the conditions of vehicle 1, e.g., an angle of a slope or a rotary speed of axle 7, as well as the clutch-disengagement action of CVT 4.

If hydrodynamic brake system 177 (or 177A) having variable relief valve 71 (or variable throttle 76) employs the control based on detection of the conditions of vehicle 1, relief valve 71 (or throttle 76) can minutely adjust the resistant hydraulic pressure of hydraulic fluid flow caused by hydraulic pump 70 serving as the braking force to reduce the rotary speed of axle 7 in correspondence to various parameters about conditions of vehicle 1, e.g., an angle of a slope or a rotary speed of axle 7, as well as depression degree D of accelerator pedal 59.

Further, if electromagnetic brake system 277 employs the detection of conditions of vehicle 1, controller 84 may serve as the controller for controlling AC/DC converter 81 for supplying electricity to regenerative brake 80 based on detection of the conditions of vehicle 1, so that controller 84 can minutely adjust generation of the rotation resistance by regenerative brake 80 serving as the braking force to reduce the rotary speed of axle 7 in correspondence to various parameters about conditions of vehicle 1, e.g., an angle of a slope or a rotary speed of axle 7, as well as depression degree D of accelerator pedal 59.

Although the invention has been described in its preferred form with a certain degree of particularity, it is understood that the present disclosure of the preferred form can be changed in the details of construction, and the combination and arrangement of parts may be changed, without departing from the scope of the invention as hereinafter claimed.

What is claimed is:

1. A brake system for a vehicle equipped with a continuously variable belt transmission ("CVT") having a CVT input shaft and a CVT output shaft,
   wherein the CVT functions as a clutch-disengagement action for isolating rotation of the CVT output shaft from rotation of the CVT input shaft when a rotary speed of the CVT input shaft is reduced to a certain level,
   wherein the vehicle is equipped with a prime mover driving the CVT input shaft so that an output rotary speed of the prime mover defines the rotary speed of the CVT input shaft,
   wherein the vehicle is equipped with an accelerator manipulator for controlling the output rotary speed of the prime mover, and
   wherein the brake system is configured to cause a resistance against the, rotation, of the CVT output shaft according to an operation of the accelerator manipulator to reduce the output rotary speed of the prime mover so as to make the CVT function as the clutch-disengagement action.

2. The brake system according to claim 1, further comprising:
   a hydraulic pump driven by the rotation of the CVT output shaft; and
   a hydraulic circuit for supplying fluid to the hydraulic pump and for releasing fluid delivered from the hydraulic pump, wherein the hydraulic circuit includes a hydraulic resistance means for applying a hydraulic pressure to a hydraulic fluid flow caused by the hydraulic pump so that the hydraulic pressure serves as the resistance of the brake system against the rotation of the CVT output shaft.

3. The brake system according to claim 2,
   wherein the hydraulic pump has, a variable displacement and is provided with an adjusting means for adjusting the variable displacement,
   the brake system further comprising:

a pump control linkage operatively connecting the accelerator manipulator to the adjusting means of the hydraulic pump.

4. The brake system according to claim 3, further comprising:
- a detection means detecting a condition of the vehicle; and
- a controller for controlling the adjusting means of the hydraulic pump based on a detection, signal from the detection means in correspondence to the detected condition of the vehicle.

5. The brake system according, to claim 2,
- wherein the hydraulic resistance, means is provided with an adjusting means for adjusting, the hydraulic pressure,
- the brake system further comprising:
- a hydraulic pressure control linkage operatively connecting the accelerator manipulator to the adjusting means of the hydraulic resistance means.

6. The brake system according to claim 5, further comprising:
- a detection means detecting a condition of the vehicle; and
- a controller for controlling the adjusting means of the hydraulic resistance means, based on a detection signal from the detection means so as to adjust the hydraulic pressure in correspondence to the detected condition of the vehicle.

7. The brake system according to claim 2, wherein a relief valve serves as the hydraulic resistance means.

8. The brake system according to claim 2, wherein a throttle serves as the hydraulic resistance means.

9. The brake system according to claim 2, further comprising:
- a speed reduction unit interposed between the CVT output shaft and the hydraulic pump.

10. The brake system according to claim 1, further comprising:
- a regenerative brake, wherein the regenerative brake is driven by the rotation of the CVT output shaft so as to function as a generator or is supplied with electricity so as, to function as a brake causing a magnetic resistance serving as the resistance of the brake system reducing the rotary speed of the CVT output shaft;
- an electric circuit for recovering electricity generated by the regenerative brake functioning as the generator and for supplying electricity to the regenerative brake functioning as the brake, wherein the hydraulic circuit includes a battery that reserves electricity generated by the regenerative brake functioning as the generator, and wherein the hydraulic circuit includes a controller that commands to supply the electricity from the battery to the regenerative brake functioning as the brake; and
- an electricity control linkage operatively connecting the accelerator manipulator to the controller.

11. The brake system according to claim 10, further comprising:
- a detection means detecting a condition of the vehicle, wherein the controller controls the electricity supply to the regenerative brake based on, a detection signal from the detection means so as to adjust the magnetic pressure in correspondence to the detected condition of the vehicle.

12. The brake system according to claim 10, further comprising:
- a speed reduction unit interposed between the CVT output shaft and the regenerative brake.

* * * * *